Figure 8:
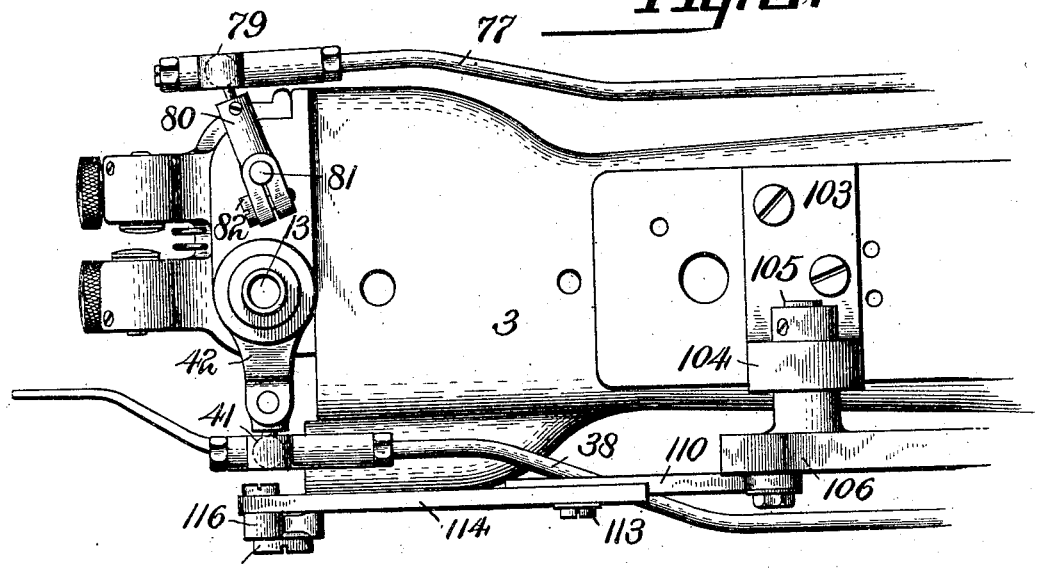

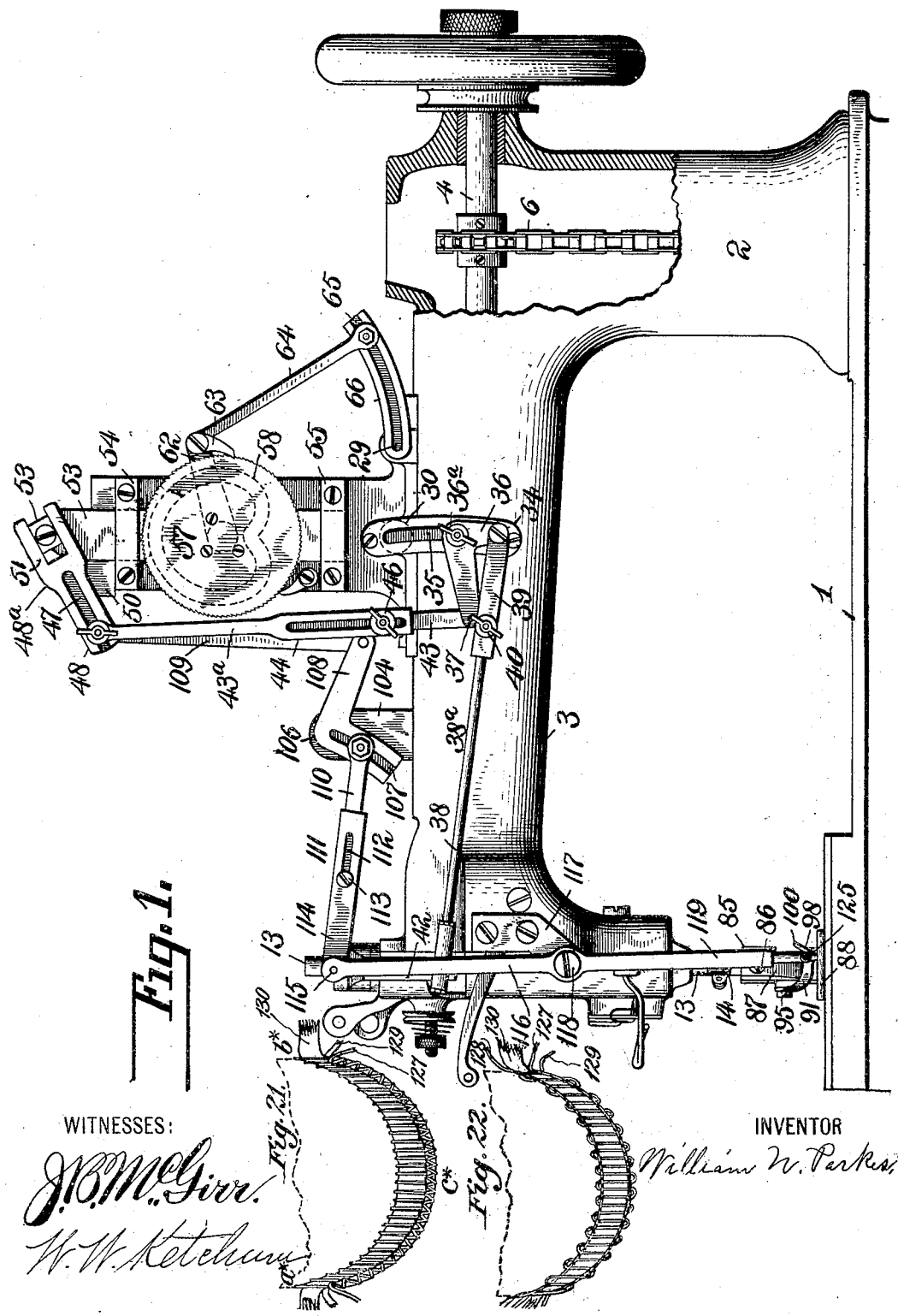

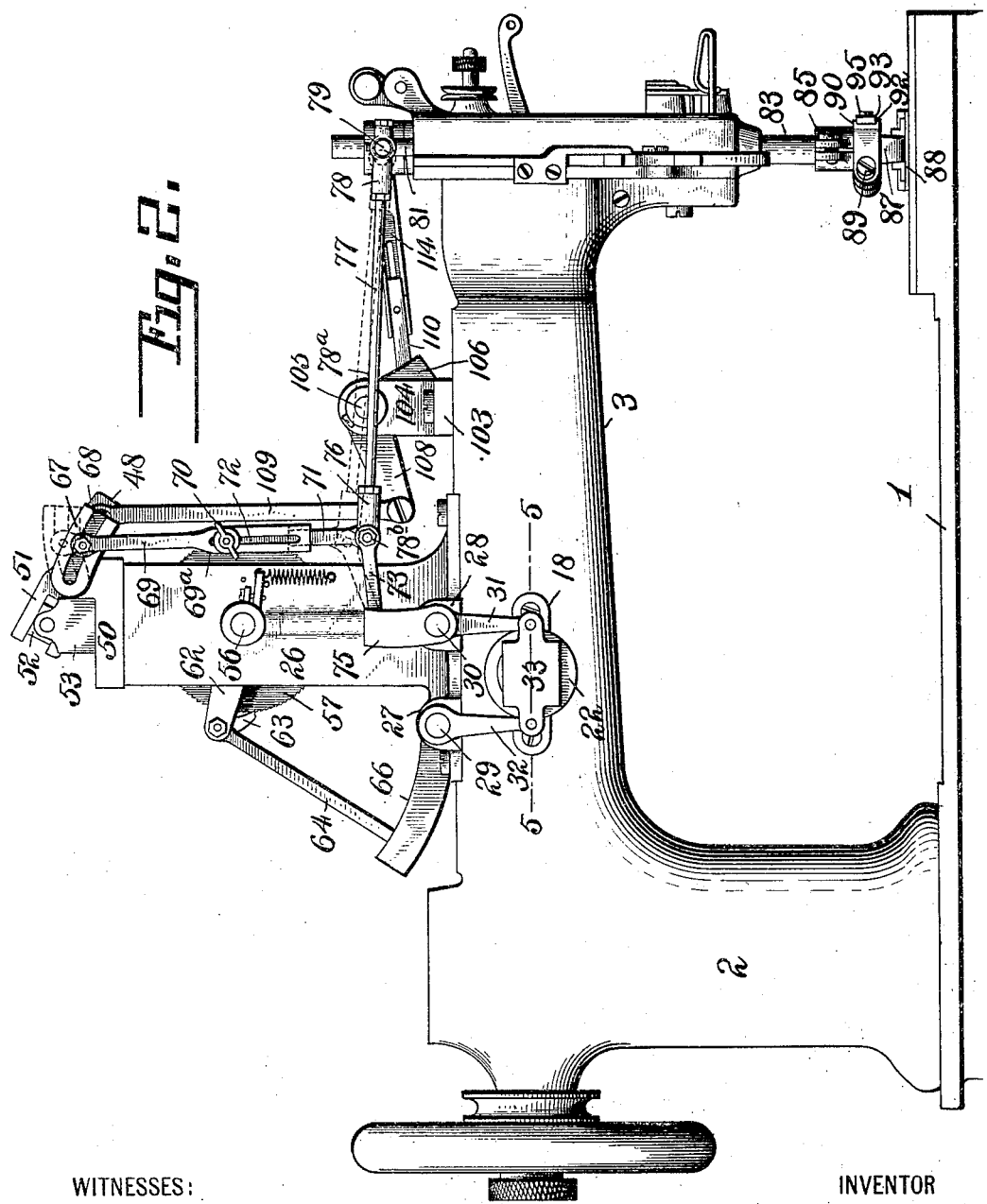

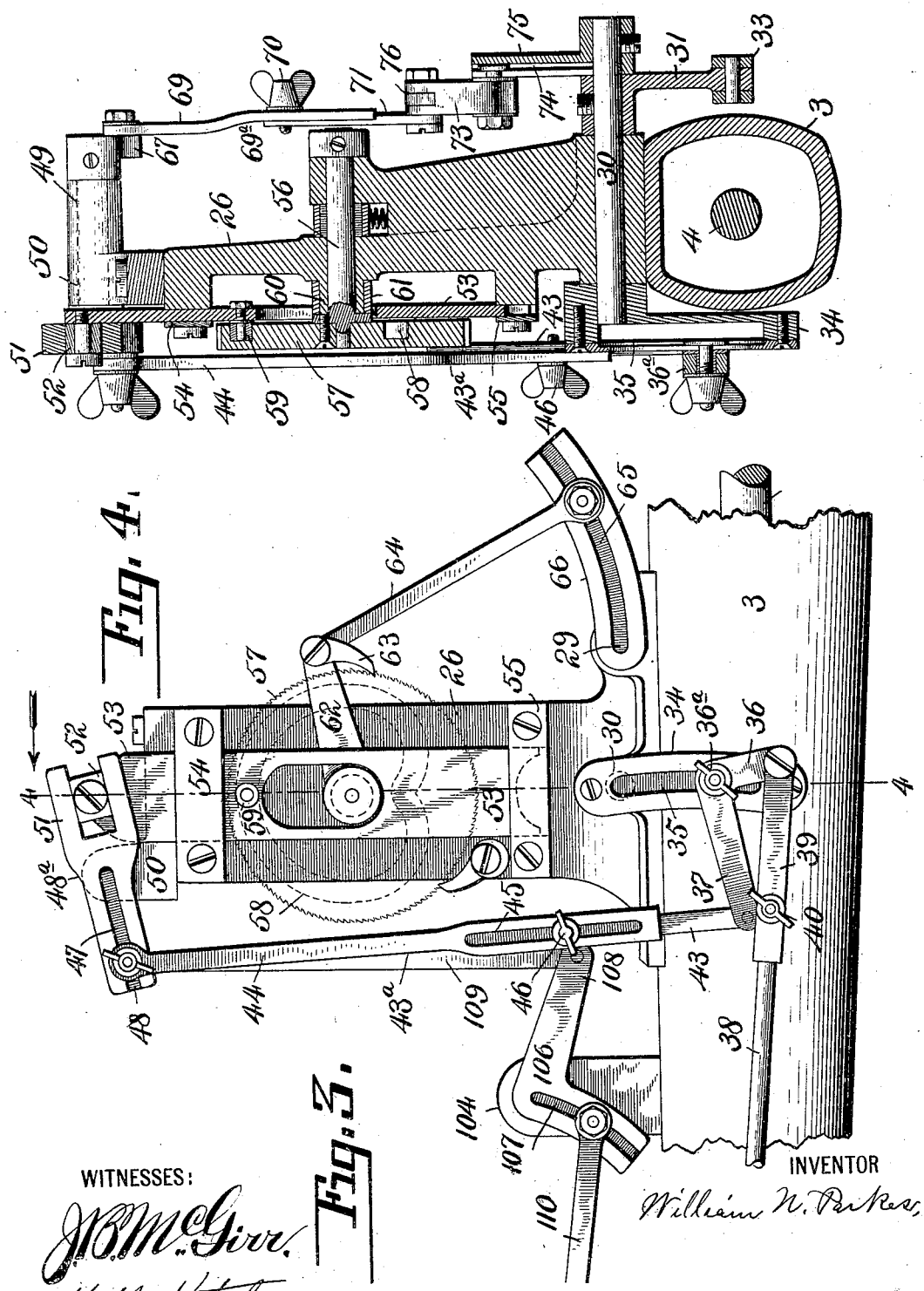

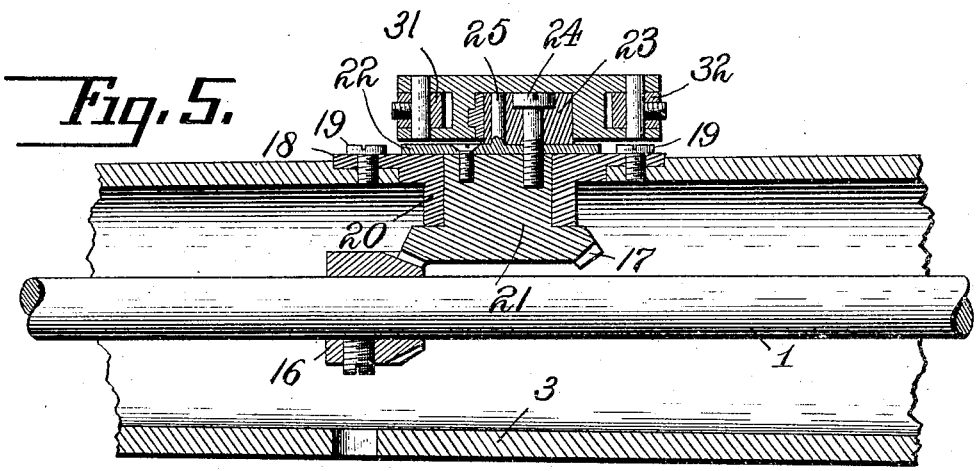

No. 875,628. PATENTED DEC. 31, 1907.
W. N. PARKES.
SCALLOPING EMBROIDERY MACHINE.
APPLICATION FILED MAR. 6, 1907.

6 SHEETS—SHEET 5.

WITNESSES:
INVENTOR
William N. Parkes.

No. 875,628.
PATENTED DEC. 31, 1907.
W. N. PARKES.
SCALLOPING EMBROIDERY MACHINE.
APPLICATION FILED MAR. 6, 1907.
6 SHEETS—SHEET 6.
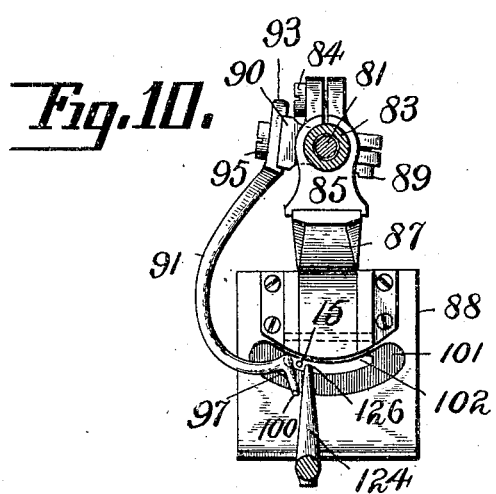
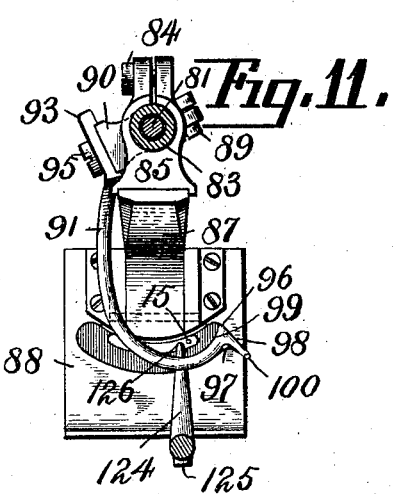
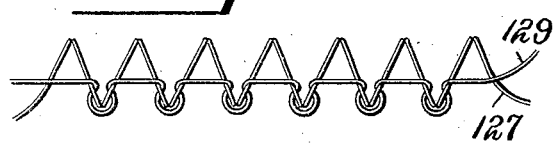
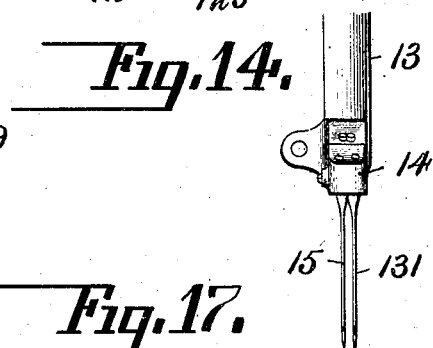
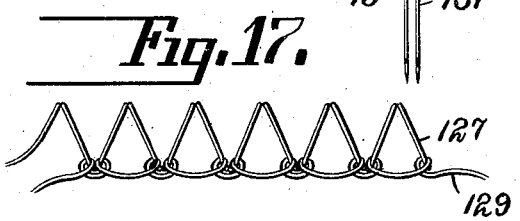
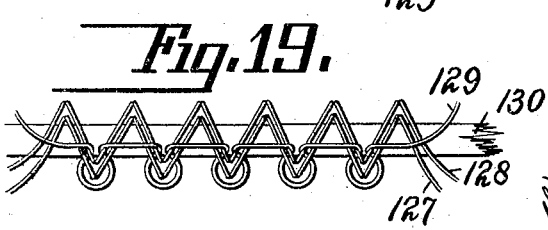
WITNESSES:
J. B. McGiver.
W. W. Ketchum
INVENTOR
William N. Parkes.

UNITED STATES PATENT OFFICE.

WILLIAM N. PARKES, OF BROOKLYN, NEW YORK.

SCALLOPING-EMBROIDERY MACHINE.

No. 875,628.

Specification of Letters Patent.

Patented Dec. 31, 1907.

Application filed March 6, 1907. Serial No. 360,900.

*To all whom it may concern:*

Be it known that I, WILLIAM N. PARKES, a citizen of the United States, residing in Brooklyn, county of Kings, and State of New York, have invented a new and useful Improvement in Scalloping-Embroidery Machines, of which the following is a description.

This invention is primarily intended for use in a machine in which the needle has a lateral movement such as is shown, and described in United States Patent Number 592,510 issued to me October 26, 1897. In the machine therein shown a needle is reciprocated vertically and vibrated or moved laterally, and the working position of the said laterally vibrating needle is automatically changed laterally.

In my present machine the needle or needles are vibrated or moved laterally, and the working position of the said laterally moving needles are changed laterally, but means other than those shown in my said patent are provided for performing these functions.

In my present machine as in my said previous patent, the working position of the laterally moving needle is changed laterally from the action of a cam which may be of any suitable shape. For example by using such a cam as is indicated in dotted lines in Figure 1, scallops as shown in Fig. 21 may be embroidered. In embroidering these scallops the work is moved along progressively as in a plain stitch machine, and simultaneously with this movement of the work, the working position of the laterally moving needle is changed laterally through the action of said cam, and the embroidery stitches are thereby located along a scalloped path as shown in said Fig. 21. By referring to said figure it will be seen that, if the work is not moved laterally the working position of the laterally moving needle must change progressively laterally all the time in order to embroider a scallop as shown in said figure.

One of the main objects of my present invention is to provide means for coöperating with a needle having a lateral movement such as described, for making a purl or button-hole finish along the edge of the embroidered scallop or design. And it is also one of the main objects to provide means, for coöperating with a needle having such a lateral movement, to place a filling material or cord under the said scalloped design.

In the work done on sewing machines the thread is anchored in the material at the point where the needle penetrates the same, and the thread runs on the surface of the material from one to another of these points as the stitching progresses. When the needle is reciprocated only, and the work is moved in a right line only, the thread runs from one to another of said points in substantially a straight line, but when the reciprocating needle is moved laterally, then the said thread runs laterally to the lateral points where the needle penetrates the work.

A sewing machine is said to have made a stitch when the stitch-forming mechanism has anchored the thread in the material at the point where the needle previously penetrated the same. For the purpose of clearness in this application the portion of the needle thread that runs from one to another of these stitches is called a link of thread, and the stitches are said to be connected on the top of the work by links of needle threads.

In a large number of different kinds of sewing machines a relative lateral movement is produced between the needle or needles and the work, and this movement is subdivided into different kinds of specific lateral movements. For example a relative movement alternately in opposite directions is produced and this is called a vibratory, oscillatory jogging, to and fro etc., relative movement. This movement consists of a single step in one direction, and then a single step in the opposite direction. In addition to this movement there is what is called a progressive relative lateral movement. In this movement there are a plurality of successively relative lateral movements in one direction, and then a plurality of such movements in an opposite direction.

The term, a relative step by step, lateral movement between said needle and the work, used in this specification and the claims is to be understood to mean a plurality of relative lateral movements between the needle and the work in one direction during the making of a plurality of stitches, and then a plurality of relative lateral movements in an opposite direction during the making of a plurality of stitches and so on. And the term "relative progressive step by step, lateral movement" means the same thing as said relative step by step lateral movement. Both of these terms mean a relative lateral movement in one direction during the making of a plurality of stitches, and then the reversal of this relative movement during the making of another plurality of stitches. A progressive movement is to be understood to mean a movement in a single direction during the making of a plurality of stitches in contradistinction to a to and fro, or reciprocating movement.

It is common in sewing machines to pass back and forth under a needle, or under needles, an auxiliary thread, and for this purpose a laterally moving finger is used. The device used in my invention for manipulating an auxiliary thread or cord is not to be understood to be a finger. By my device the thread is looped completely around the links of the needle thread in contradistinction to simply passing the same under said links and thereby causing it to be stitched to the fabric. By my device the auxiliary thread is turned back and completely around the links of needle-thread as is clearly illustrated in the drawings. And this work is done and simultaneously therewith the laterally vibrating needle or needles, and the auxiliary co-acting parts are moved laterally and scallops with a purl or button-hole finish along their edge are thereby embroidered, and said purl is composed of said auxiliary thread and the needle-thread.

Referring again to the objects of my present invention, it is noted that another important object of the same is, to provide means for looping an auxiliary thread around links of the needle thread of a laterally moving needle, and in line with one row of the lateral stitches. And it is also one of the important objects to so locate said means, and operate the same that the links of needle thread may be looped or twisted around said auxiliary thread in line with one row of lateral stitches. And it is also an object to so construct and locate said means that the needle may be moved laterally step by step, a filling or auxiliary cord or tape guided laterally with said needle, and under the reciprocating path of the same, and in combination therewith, a second auxiliary thread or cord passed back and forth under said needle so that it is stitched down on top of said first auxiliary cord.

Still another object of this invention is to so construct and locate said means that two needles may be moved laterally step by step, an auxiliary thread concatenated with the threads of said needles back and forth across the space between the same, and a filling material guided under said auxiliary thread.

Other objects will be disclosed in connection with the illustrations, and the description of the same.

Figure 9:
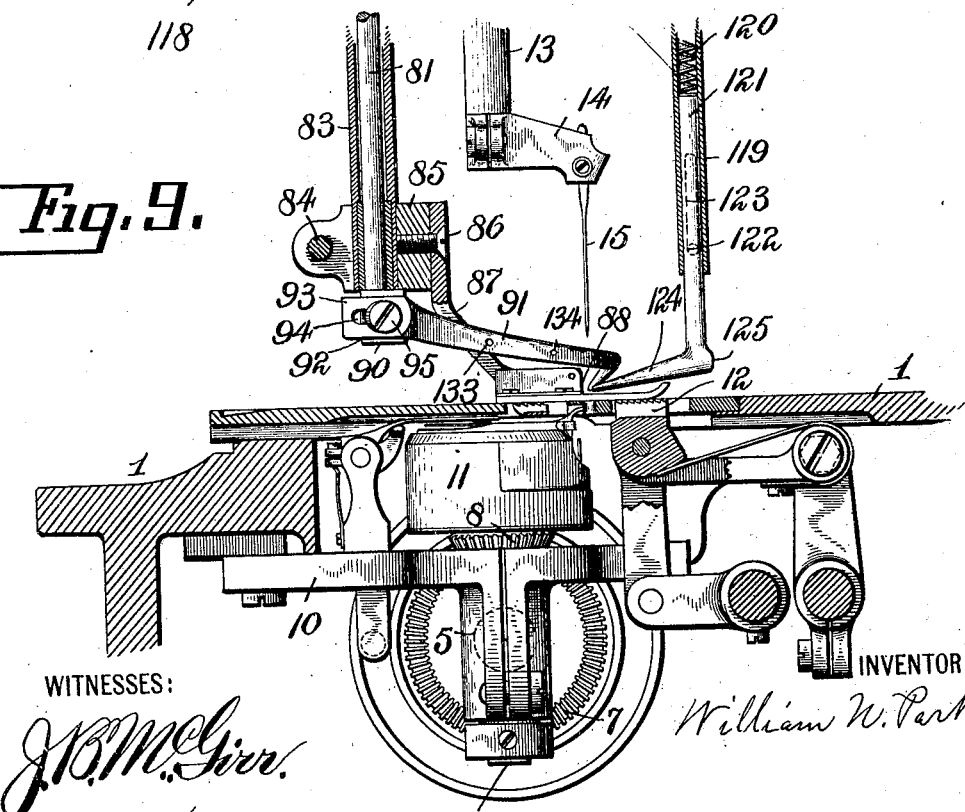

Referring to the drawings: Fig. 1, is a front view of the machine; Fig. 2, is a rear view of the same; Fig. 3, is an enlarged front view of the mechanism which moves the needle laterally; Fig. 4, is a sectional view taken on the line 4—4 of the Fig. 3; Fig. 5, is a sectional view taken on the line 5—5 of the Fig. 2; Figs. 6 and 7 are details showing the cam action by means of which all of the mechanism which operates to move the needle laterally, to change the working position of the needle, to oscillate the thread-carrying finger, to change the working position of said finger, and to move the device laterally which carries the filling material is operated; Fig. 8, is a top plan view of the forward end of the arm of the machine; Fig. 9, is an end view of the base of the machine, parts omitted for the purpose of disclosing the complemental stitch forming mechanism, and location of the parts relative to the same; Fig. 10, is a top plan view showing the auxiliary thread carrier, and tube for carrying the filling material in one of its extreme lateral positions, and Fig. 11, shows the same parts in their other extreme lateral positions, and Figs. 12 and 13, show the relative position of these parts when two needles are used; Fig. 14, is a front view showing the two needle clamps connected to the needle-bar; Fig. 15, is a diagrammatic view showing the ordinary zigzag stitch; Fig. 16, is a diagrammatic view of a zigzag stitch showing how the auxiliary thread loops around the same, and Fig. 17, shows how the same auxiliary thread is drawn to the edge or in line with one row of lateral stitches; Fig. 18, is a diagrammatic view indicating the appearance of the purl along one row of lateral stitches with the auxiliary thread taut, and the needle thread looped around the same; Fig. 19, is a diagrammatic view showing the manner in which the auxiliary thread is looped around the needle threads when a plurality of needles are used; Fig. 20, is a diagrammatic view of stitches made when the needle is moved laterally step by step; Fig. 21 is a diagrammatic view of the stitches shown in Fig. 18 disposed in a scallop; Fig. 22 is a diagrammatic view of a scallop made with the movement of the two needles adjusted so they are moved laterally step by step, the auxiliary thread being passed back and forth under said needles, so that a link of the same is stitched to the fabric once to each stitch forming operation.

In the drawings 1 indicates the bed of the machine, 2 the vertical, and 3 the overhanging portion of the arm. In suitable bearings in the arm, is located a shaft 4, and in suitable bearings in the bed of the machine is located a shaft 5, (indicated by dotted lines in Fig. 9) a chain 6 being used to drive the lower shaft from the movement of the driving shaft. These shafts revolve in unison with each other, and to the forward end of the shaft 5, is attached a gear wheel 7, which engages with a gear wheel 8, secured to the upper end of a short vertical shaft 9, which is suitably located in a bracket 10, secured in a usual manner to the under side of the bed 1 of the machine. The gear wheel 7, is twice the diameter of the gear wheel 8, so it is to be understood that the shaft 9 revolves twice to each revolution of the shafts 4 and 5.

To the upper end of the shaft 9 is secured a hook 11, (which is adapted to carry a bobbin case and a bobbin,) to coöperate with the needle thread, and pass loops of the same around the said bobbin case, in substantially the same manner as described in my United States Patent Number 730,692, dated June 9, 1903. In the said patent, the hook is arranged at the side of the needle for the purpose of doing plain stitching only, but in my application, Serial Number 93,037, filed February 7, 1902, the needles are arranged in front of the hook, and disposed so that they move laterally in a path that is concentric with the path of the beak of the looper. This disposition and construction of the looper as described in the said patent, and application, permits of a very large lateral movement of the reciprocating needle or needles.

12 is a feed dog which is operated in the manner shown and described by me in application Number 150,182, filed March 30, 1903, and the same may be removed from above the bobbin case in the manner shown in said co-pending application.

While any suitable feed mechanism, and any suitable looper mechanism may be used in connection with my present invention, I prefer to use the feed mechanism shown in my said application, and the looper mechanism shown in my aforesaid patent and application.

In bearings in the face of the arm of the machine, is located a needle-bar 13, to the lower end of which is connected a needle holder 14, which carries a needle 15. The needle-bar 13 is disposed so that the axis of the same is concentric with the axis of the looper 11, and the said needle-bar is reciprocated, and adapted to turn on its vertical axis, in the manner shown and described in the aforesaid co-pending application, Serial Number 150,182. The needle is carried by the needle holder eccentrically with respect to the axis of the needle-bar, so that when the bar is oscillated, the needle is moved laterally in a path that is concentric with the path of the beak of the looper as before stated, and as described in the said co-pending application.

To the driving shaft of the machine is secured a gear 16, which meshes with a gear 17 as shown in Fig. 5. The gear 17 has twice the number of teeth as the gear 16, therefore the former turns only once to two revolutions of the driving shaft 1. A plate 18 which is secured to the arm of the machine by screws 19, and which has a portion 20 that extends in the arm of the machine, serves as a bearing for a hub 21 formed on the gear 17, and a bearing plate 22 serves as a means for retaining the hub 21 in its bearing as shown in Fig. 5. A cam 23 is secured to the hub 21 of said gear, by means of a screw 24, and the cam is rigidly held from turning relative to the hub 21 by means of a pin 25 that extends outwardly from the plate 22. It is now of course understood, that when the shaft 1 is revolved, the cam 23 is also revolved once to two revolutions of said shaft. On the upper part of the arm of the machine is secured a bracket 26, on which is formed bearing portions 27 and 28, and in the said bearing portions is located to oscillate shafts 29 and 30, which are disposed in a horizontal plane transversely of the arm of the machine. To the rear ends of the shafts 29 and 30, are secured depending arms 31 and 32, and to the lower ends of said arms is pivoted a part 33 that is engaged by the cam 23 as shown in Figs. 6 and 7. To the forward end of the shaft 30, is secured a segment lever 34, in which is formed a way 35, that extends over the axis of the shaft 30.

The foregoing is the means provided for driving the mechanism of my present invention, and the said means will be found more fully shown and described in my co-pending application Serial Number 179,470, filed November 2, 1903.

I will now describe the mechanism which my present invention comprises, and which is adapted for use in combination with the foregoing generally described mechanism. It is desired that it be understood that my present invention may be used in combination with mechanism other than that described, and it is also to be understood that the preferred means herewith employed for the disclosure of my present invention may be modified or changed in various ways.

It is understood of course, when the machine is in action the cam 23, is revolved and this movement of said cam oscillates the part 33, the shaft 30 and the segment arm or lever 34. The cam is so constructed and timed, that the said segment lever oscillates laterally when the needle is disengaged from the work, but has no lateral movement when the needle is in engagement with the work.

In the way 35 of the segment lever 34, is adjustably pivoted a bell crank lever 36ª having arms 36 and 37, the arm 36 being much shorter than the arm 37 as shown in Figs. 1 and 4. To the end of the short arm 36 is pivoted one end of a pitman 38ª comprising parts 38 and 39, these parts being adjustably secured together by means of a thumb nut 40 in the usual manner. The forward end of the part 38 of the pitman is secured at 41 (see Fig. 8) to an arm 42, and the latter in turn is secured to the needle-bar 13. To the outer end of the arm 37 of the bell crank lever 36ª is pivoted the lower end of a connection 43ª comprising parts 43 and 44. Through the part 44 is formed a slot 45, and passing through said slot into a seat formed in the part 43 is a thumb nut 46, by means of which, part 44 is secured to the part 43. The slot 45 permits the part 44 to be adjusted relative to the part 43, and the connection which comprises these two parts to be thereby made longer or shorter. The upper end of the said connection 44 is adjustably pivoted in a way 47 formed in the end 48 of a lever 48ª that is secured to the forward end of a shaft 49, the latter being journaled in an auxiliary bracket 50 secured to the top of the bracket 26. The other end of said lever is forked as at 51.

A shoe 52 is suitably pivoted on the upper end of a slide 53, and the said shoe is embraced by the forked end 51 of the aforesaid lever. The said slide is adapted to reciprocate in bearings 54 and 55, which are secured to the face of the bracket 26, (see Figs. 3 and 4.) To the forward end of a short shaft 56 is secured a ratchet wheel 57, in the rear side of which is formed a cam groove 58, the path of which is formed as indicated by dotted lines in Fig. 3. To the face of the slide 53 is pivoted an anti-friction roller 59 that extends into the cam groove 58 of the ratchet wheel, and by this means the slide is reciprocated when the ratchet wheel is rotated. On a hub 60 formed on the bracket 26 is pivoted an end 61 of a pawl lever 62, which carries at its outer end a pawl 63 that engages the teeth of the ratchet wheel 57. Also to the outer end of said pawl lever, and in rear of the pawl, is pivoted one end of a connection 64, the other end of said connection being adjustably pivoted in a way 65 formed in an arm 66, the latter being secured to the forward end of the shaft 29.

To the rear end of the shaft 49, is secured an arm 67 in which is formed a way 68, and in the said way is adjustably pivoted a part 69 of a two part connection 69ª. To the lower end of the part 69 is adjustably secured by means of a thumb nut 70 the other part 71 of the said two part connection, a slot 72 being formed through the part 69 to permit of the adjustment of the parts of the said connection relative to each other. The lower end of the part 71 is pivoted to the end of a part 73, and the other end of said part 73 is adjustably secured in a curved way 74 formed in an arm 75 that is secured to the rear end of shaft 30. (See Figs. 4, 6 and 7). In the outer end of the part 73 is pivoted one end of a part 76, in the other end of said part 76 is adjustably secured one end of a rod 77. To the other end of said rod is adjustably secured a bearing piece 78 which embraces a ball 79 secured to the outer end of an arm 80. These parts 73, 76, 77 and 78 as a whole constitute a connection between the arm 75 and the ball 79, and I give the said connection reference character 78ª. This connection at 78ᵇ is joined so that a toggle joint is formed at this point in the same. The other end of the arm 80 is adjustably secured to the upper end of a small vertical shaft or rod 81, by means of a screw 82 as shown in Fig. 8. The rod 81, is journaled in a tubular presser bar 83 which is mounted in a usual way in bearings in the face of the arm of the machine.

The presser-bar is adapted to be raised and lowered by a usual presser foot lifter, and the said bar is depressed by the usual presser-bar spring as is shown in my co-pending application Serial Number 32,041, filed October 4, 1900.

To the lower end of the presser-bar 83 is clamped by means of a screw 84 a presser foot carrier 85, and to the said carrier is secured by means of a screw 86 the shank 87 of a presser foot 88. (See Figs. 9, 10 and 11.) Just below the end of the presser bar is clamped to the lower end of the rod 81, by means of a screw 89 a bearing 90 adapted to carry an auxiliary thread carrying finger or arm 91. The bearing 90 has a way 92 milled in it, and in said way is located a flattened end 93 of the finger 91, and through said flat end a slot 94 is formed, through which passes a screw 95 that is seated in the said bearing 90. The said way, slot and screw serves as a means for adjusting the finger 91 horizontally, and securing the same to the bearing 90. The finger or arm 91 extends in a curved manner from the bearing 90, as shown in Figs. 10, 11, 12 and 13, and has formed on it near its outer end a nose 96, through which runs a thread eye 97. From the point of the nose 96 run inclines 98 and 99. The incline 98 terminating in an end 100, as shown in the said figures; the object of this construction of the said finger 91 will be explained in connection with the workings of the machine. In the upper side of the presser foot is a depression 101, through which passes the needle slot 102. The object of the said depression is to permit the nose of the finger to operate close to the material. In the face of the presser foot 88, back of the needle slot 102, is milled a way or groove (not shown) that extends to the heel of the presser-foot, suitable for the passage of the embroidered scallop or design as it is fed away from the needle.

On the top of the arm of the machine, is secured another bracket 103, having an upwardly extending portion 104 in which is journaled a short shaft 105. To the forward end of said shaft is secured a bell crank lever 106 in one arm of which is formed a way 107, to the rear side of the end 108 of the said lever is pivoted the lower end of a connection 109, the upper end of said connection being pivoted to the rear side of the end 48 of the lever that is in engagement with the slide 53. The arm 108 of the bell crank lever is considerably longer than the other arm of the said bell crank lever as is shown in Figs. 1 and 3. In the way 107 is adjustably secured one end of a part 110, of a two part connection 111, and the other end of the part 110 is adjustably secured by means of a slot 112, and a screw 113, to one end of the part 114 of the said two part connection, and the other end of said part 114, is pivoted at 115 to the upper end of a lever 116. A bracket 117 is secured to the arm of the machine, and on the same is pivoted at 118 the lever 116. The lower portion 119 (see Fig. 9) of the lever 116, is bored, and in the said bore is located a spring 120, and a plunger 121. In the said plunger is secured a pin 122 that extends outwardly into a slot 123 formed through the wall of the lower portion of said lever, as shown in dotted lines in Fig. 9. The normal tendency of the spring 120 is to press the plunger downwardly and the pin 122 coming in engagement with the lower end of the slot 123 limits the downward movement of the said plunger and the engagement of the said pin with the lateral wall of the said slot prevents the plunger from turning laterally in its bearing. The lower end of the plunger is elbowed as shown in Fig. 9, and from the elbow it terminates into a finger 124 that extends under the auxiliary thread carrying finger or arm 91, as shown in Figs. 10, 11, 12 and 13. At the heel of the said elbowed portion commences a bore 125 that passes longitudinally through the finger 124, so that a filling material or cord may enter the said bore at the heel of the elbow, and be discharged from the finger at its extreme end 126.

It will be understood from the foregoing that when the presser-foot is elevated it will contact with the under side of the finger 124 of the plunger 121 and raise the same against the action of the spring 120. It is thus seen that means are provided for raising the finger and auxiliary looper with the presser foot for the insertion or removal of the work, or for other purposes.

Reference character 127 represents the needle thread when a single needle is used, and reference character 128 the thread of an additional needle. Reference character 129 represents an auxiliary thread which is carried by the auxiliary thread carrying finger or arm 91, and reference character 130 represents a filling material that is guided through the finger 124 and reference character 131 represents the additional needle when more than one needle is used.

I will now describe the workings of the machine, and adjustments in the same for producing certain results.

If it is desired to make the plain zigzag stitch, as indicated in Fig. 15, the end of the connection 64 is adjusted in the way 66 over the axis of the shaft 29. This stops all movement of the said connection and the parts operated by it. Then the bell crank lever 36ª is adjusted in the way 35 a sufficient distance from the axis of the shaft 30 to produce the desired extent of lateral movement in the needle. Under this adjustment the bell crank lever 36ª will be carried bodily laterally by the lateral movement of the arm 34, and through the connection 38ª the needle-bar will be oscillated, and the needle thereby moved laterally from the movement of said arm. And the said bell crank lever will be held from turning on its own axis by the connection 43ª, so the needle will be moved laterally a predetermined extent, and a plain zigzag stitch as in Fig. 15 will then be made. To dispose these stitches on the work so as to make the embroidered scallop shown in Fig. 21, the following adjustments are made.

The lower end of the connection 64 is adjusted a sufficient distance from the axis of the shaft 29 to actuate the pawl 63 so as to turn the ratchet wheel 57 at the desired speed. The end of the connection 43ª is adjusted out in the way 47 a sufficient extent to oscillate the bell crank lever 36ª a sufficient extent on its axis.

It will now be understood that in the operation of the machine the slide 53 will be reciprocated, the lever 48ª oscillated, the connection 43ª reciprocated, and the bell crank lever 36ª oscillated, and through the connection between the same and the needle the working position of the latter will be changed laterally. The bodily lateral movement of the bell crank lever 36ª moves the needle laterally and the operation of said bell crank lever on its axis changes laterally the working position of the said laterally moving needle.

To operate the auxiliary thread carrying finger so as to loop an auxiliary thread around the links of needle thread of the said needle, the following adjustments are made.

The end of the part 73 of the connection 78ª is adjusted out on the arm 75 a sufficient extent to give the desired oscillating movement to the rod 81, and through it the desired extent of lateral movement to the auxiliary thread carrying finger 91. Then the end of the connection 69ª is adjusted away from the axis of the pivot of the arm 67 a sufficient distance, to change the working position of the oscillating finger 91, laterally the extent that the working position of the needle is changed laterally. The auxiliary thread 129 is passed through a usual tension device and then it is guided by usual means to, and through thread eyes 133 and 134 in the finger 91 thence to the thread eye 97 that passes through the nose of the said finger. As the finger moves laterally by the needle thread that runs from the same to the work, the inclined faces 98 and 99 of the nose of the finger 91 strikes the said needle thread, and deflects the same from the path of the finger. The point 96 of the nose of the finger extends from the finger a sufficient extent to draw the auxiliary thread back of the needle even though the work is moved a very limited extent to each stitch. To adjust the parts so as to draw the auxiliary thread in line with one row of the lateral stitches the position of the finger is adjusted around on the rod 81, by means of the clamping screw 89, so that the finger is moved more to one side than the other of the needle or needles. For example if it is desired to draw the said auxiliary thread taut in line with the row of lateral stitches made when the needle moves to the right, then the said finger is adjusted so it moves more to the right of the needle than to the left, as shown in Figs. 10, 11, 12, and 13. It will now be understood that as the needle moves back and forth laterally the finger is moved back and forth laterally in unison with the needle, but a greater extent than the said needle, and that by said movements of these parts the auxiliary thread is looped around the links of the needle thread as per the diagrammatic view Fig. 16. If it is desired to twist the needle thread around the auxiliary thread as shown in Fig. 18, then the tension on the auxiliary thread is made strong enough relative to the tension on the needle thread to do this.

It is of course clear that the supply of auxiliary thread is drawn on the side of the needle that the looper moves the greater extent, and that said looper thread will be loose when the looper moves in the opposite direction. For example, when the looper moves to the position shown in Fig. 11, it will draw the supply of auxiliary thread against the tension that may be placed on the same, and this will draw the loop of auxiliary thread taut around the links of lateral stitches along this edge of the design. Then when the looper moves in an opposite direction to that shown in said Fig. 11, the relation between the needle and the looper will be as indicated in Fig. 10, and in this position it will be noticed that the delivery eye of the looper is much closer to the needle, and therefore it is evident that the looper thread will not be taut, and the loop of the same will not be drawn in this direction.

In the position of the parts as shown in dotted lines in Fig. 2, the finger 91 is in the position shown in Fig. 10, and this is the position of said parts when a scallop is commenced, as at $a^*$ Fig. 21. As the stitching of the scallop progresses the finger is oscillated laterally with the needle, and the working position of the said oscillating finger is changed laterally in unison with the lateral change in the working position of the laterally moving needle until the connection $78^a$ has reached the position shown in dotted lines in Fig. 2. When the said part has reached this point, the stitching has reached the point $c^*$ Fig. 21. Then during the movement of the connection $78^a$ from its position in dotted lines to full lines the part of said scallop from $c^*$ to $b^*$ is stitched, and this completes a scallop. In making this scallop the working position of the finger 91 is changed laterally progressively with the lateral change in the working position of the needle. When the apex $c^*$ of the scallop has been reached the finger 91 is in the position shown in Fig. 11 and when the point $b^*$ is reached it is of course back in the position shown in Fig. 10.

To guide a filling material under the links of thread of which this scallop is formed the end of the connection 110 is adjusted in the way 107 so that the finger 124 moves laterally the same extent, that the working positions of the needle and of the auxiliary thread carrying finger 91, are changed laterally. Unlike the needle, and the auxiliary thread carrying finger 91, this finger 124 does not vibrate laterally as its position is being changed laterally. This finger 124 extends practically under the needle, so that the filling material 130 that is guided through the same is delivered under the horizontal path of the needle, or under the link of needle thread that runs from one to another of the lateral stitches.

To make the scalloped design shown in Fig. 20 the bell crank lever is adjusted over the axis of the pivot of the arm or segment lever 34, and the two part connection $43^a$ is adjusted to a proper length for this purpose. With the parts so adjusted the needle will not receive any lateral movement from the action of the cam 23, but will be moved progressively laterally from the action of the cam 58, as the ratchet wheel 57 is revolved. When this design is to be stitched the working position of the finger 91 is adjusted so it moves an equal distance laterally on each side of the needle and the end of the part 69 is adjusted in the way 68 so that the working position of the said laterally moving finger will change laterally in unison with the lateral change of the needle, and the same extent that said needle changes laterally. And the end of the part 110 is adjusted in the way 107 of the lever 106 so that the finger 124 is moved laterally also the extent that the needle is moved laterally.

To stitch the design shown in Fig. 22 the parts are adjusted as above, except a needle clamp is attached to the needle-bar that will hold two needles.

In Figs. 12 and 13 the relation of the parts are shown when two needles are used, and the said two needles are moved laterally and their working positions are changed laterally to embroider a scallop over a path such as is shown in Fig. 21. To use two needles for this purpose the movement of the finger 91 relative to the movement of the finger 124 is changed to permit of the use of two needles as shown in said Figs. 12 and 13. Here it is seen that the extent of the lateral movement of the finger 124 has been slightly reduced as compared with the movement of the finger 91 as shown in Figs. 10 and 11.

In making a scallop such as is shown in Fig. 22 the working position of the finger 124 is adjusted so that it is central between the two needles, and delivers the filling material between the same.

Having now described a preferred form of my invention, what I claim as new is:

1. A sewing machine comprising a reciprocating and laterally moving needle, means for changing laterally the working position of said laterally moving needle so as to embroider scallops, and means for concatenating an auxiliary thread with the thread of which said scallops are composed so as to form a purl or button-hole finish along the edge of said scallops.

2. A sewing machine comprising a plurality of reciprocating needles, means for moving said needles laterally step by step, means for passing back and forth under said needles an auxiliary thread and thereby securing the same to the work, and means for guiding a filling material under said auxiliary thread.

3. A sewing machine comprising a reciprocating needle, means for producing a relative lateral movement between said needle and the work so as to embroider designs, means for concatenating an auxiliary thread with the thread of said design so as to form a purl or button-hole finish along the edge of the designs, and means for guiding a filling material under the thread of which said designs are composed.

4. A sewing machine comprising a feeding device that engages directly with the work, a reciprocating needle, means for producing a relative step by step lateral movement between said needle and the work, and means for guiding an auxiliary material or cord under the reciprocating path of said needle.

5. A sewing machine comprising a reciprocating and laterally moving needle, means for changing laterally the working position of said laterally moving needle, means for looping an auxiliary thread around single links of the needle thread, and means for drawing the auxiliary thread taut so as to form a purl or button-hole edge in line with one of the outer rows or edges of stitching.

6. A sewing machine comprising a plurality of reciprocating needles, means for producing a relative progressive step by step lateral movement between said needles and the work, means for passing back and forth under said needles an auxiliary thread and thereby securing the same to the work, and means for guiding a filling material under said auxiliary thread.

7. A sewing machine comprising a reciprocating and laterally moving needle, means for automatically changing laterally the working position of said laterally moving needle, and means for looping an auxiliary thread around the links of the needle thread.

8. A sewing machine comprising a reciprocating and laterally moving needle, means for automatically changing laterally the working position of said needle, and means for looping an auxiliary thread consecutively around the single links of the needle thread.

9. A sewing machine comprising a reciprocating and laterally moving needle, means for automatically changing laterally the working position of said needle, means for looping an auxiliary thread around single links of the needle thread, and means for guiding a filling material under said links of needle thread.

10. A sewing machine comprising a reciprocating and laterally moving needle, means for changing laterally the working position of said needle, a device for carrying a filling material and guiding the same under the lateral path of said needle, and means for changing said device laterally in unison with the lateral change in the working position of the needle.

11. A sewing machine comprising a needle that is moved laterally step by step, means for looping an auxiliary thread around the needle thread, a device for carrying an auxiliary material or cord, and means for operating said device so that said material is carried laterally under said auxiliary thread in unison with the lateral steps of the needle.

12. A sewing machine comprising a reciprocating and laterally moving needle, means for changing laterally the working position of said laterally moving needle including a cam, a device for guiding a filling material under said laterally moving needle, and means whereby said device is controlled from the action of said cam so that the device moves laterally in unison with the lateral change in the working position of the needle.

13. A sewing machine comprising a reciprocating needle that moves laterally in an arc of a circle, means for automatically changing laterally the working position of said laterally moving needle in an arc of a circle, and means for guiding a filling material under said laterally moving needle.

14. The combination in a sewing machine having a reciprocating and laterally moving needle, of means for changing laterally the working position of said laterally moving needle, a laterally moving thread carrying device adapted to loop an auxiliary thread around links of the needle thread, and means for changing laterally the working position of said thread carrying device in unison with the lateral change of the working position of said laterally moving needle.

15. A sewing machine comprising a reciprocating and laterally moving needle, means including a ratchet wheel for changing laterally the working position of said laterally moving needle, a device for looping an auxiliary thread around links of the needle thread, and means intermediate said device and the ratchet wheel whereby the working position of the device is changed laterally from the movement of said ratchet wheel.

16. A sewing machine comprising a reciprocating and laterally moving needle, a ratchet operated mechanism for changing laterally the working position of said laterally moving needle, a device for guiding a filling material under said laterally moving needle, and means for operating said device from a moving part of said ratchet operated mechanism.

17. A sewing machine comprising a plurality of reciprocating and laterally moving needles, means for changing laterally the working position of said laterally moving needles, and means for looping an auxiliary thread around links of the thread of said needles.

18. A sewing machine comprising a plurality of reciprocating and laterally moving needles, means for changing laterally the working position of said needles, means for looping an auxiliary thread around links of the thread of said laterally moving needles, and means for guiding a filling cord or material under said laterally moving needles.

19. A sewing machine comprising a plurality of reciprocating and laterally moving needles, means for changing laterally the working position of said laterally moving needles, and means for guiding a filling material under said laterally moving needles.

20. A sewing machine comprising two reciprocating needles, means for moving said needles laterally step by step, means for passing back and forth under said needles an auxiliary thread or cord and thereby securing the same to the work, and means for guiding a filling material under said auxiliary thread.

21. A sewing machine comprising a plurality of reciprocating needles, means for moving said needles laterally step by step, means for passing back and forth under said needles an auxiliary thread or cord, a finger adapted to guide a filling material under said auxiliary thread or cord, and means for moving said finger laterally step by step in unison with the lateral movements of said needles 22. A sewing machine comprising a reciprocating needle adapted to be moved laterally in an arc of a circle, means for moving said needle laterally in an arc of a circle, means for changing laterally the working position of said laterally moving needle in an arc of a circle, a device for looping an auxiliary thread around the needle thread, and means for changing laterally the working position of said device in an arc of a circle.

23. A sewing machine comprising an actuating cam, a vertically reciprocating and laterally moving needle, a laterally moving auxiliary thread carrying device, means for changing laterally the working positions of the said laterally moving needle and the said laterally moving auxiliary thread carrying device from the action of said cam, a device for guiding laterally a filling material, and means for operating said device from the action of said cam.

24. A sewing machine comprising a reciprocating and laterally moving needle, an auxiliary thread carrying device, means for moving said thread carrying device laterally in unison with said laterally moving needle a greater extent than said needle moves laterally, and more to one side of the working position of said needle than the other, and means for automatically changing laterally the working position of said laterally moving needle and said laterally moving auxiliary thread carrying device.

25. A sewing machine comprising a reciprocating needle, means for progressively moving said needle laterally, means for guiding a cord under said needle along the lateral path of the same, a device for passing back and forth under said needle and on top of said cord an auxiliary thread, and means for changing laterally the working position of said device in unison with the progressive lateral movement of said needle.

26. A sewing machine comprising a reciprocating and laterally moving needle, a reciprocating slide, means intermediate said slide and the needle whereby the working position of the needle is changed laterally, a device for guiding a filling material under said needle, and means intermediate said slide and said device whereby the device is moved laterally in unison with the lateral change in the working position of said laterally moving needle.

27. A sewing machine having a needle adapted to be moved laterally, an actuating cam and means intermediate the same and the needle whereby the latter is moved laterally by the cam, a ratchet wheel, means intermediate said ratchet wheel and the laterally moving needle whereby when the ratchet wheel revolves the working position of the laterally moving needle is changed laterally, and means intermediate said cam and said ratchet wheel whereby the ratchet wheel is revolved from the action of said cam.

28. A sewing machine comprising a needle adapted to be moved laterally, an actuating cam, two shafts oscillated from the action of said cam, means intermediate one of said shafts and the needle whereby the latter is moved laterally, and means intermediate the other of said shafts and the needle whereby the working position of the laterally moving needle is changed laterally.

29. A sewing machine comprising a laterally moving needle, a presser foot, a finger adapted to carry a filling material, means for moving said finger laterally just above said presser foot, an auxiliary thread carrying looper that moves laterally just above said filling material finger, and means whereby when the presser foot is raised from the work said finger and said auxiliary looper are carried upwardly with the presser foot.

30. A sewing machine comprising a vertically reciprocating and laterally moving needle, means for changing laterally the working position of said laterally moving needle, a device for guiding a filling material under the said laterally moving needle, means for moving said device laterally with the lateral shift in the working position of said needle, a presser foot, and means whereby when said presser foot is lifted said device is lifted.

31. A sewing machine comprising a vertically reciprocating and laterally moving needle, means for changing laterally the working position of said laterally moving needle, a presser foot, a device that is adapted to guide a filling material under said needle, means for moving said device laterally in unison with the lateral shift in the working position of said laterally moving needle, a spring for normally depressing said device, and means whereby when the presser foot is raised said device is raised against the action of said spring.

32. A sewing machine comprising a reciprocating and laterally vibrating needle, means for changing laterally the working position of said laterally vibrating needle, and means for looping an auxiliary thread around the links of said needle thread.

33. A sewing machine comprising a stitch forming mechanism having a vertically reciprocating and laterally vibrating needle, means for changing laterally the vibrating position of said needle, an auxiliary looper for coöperating with said needle, means for vibrating said looper, and means for changing the vibrating position of said looper laterally in unison with the lateral change in the vibrating position of said needle.

Signed in Brooklyn, in the county of Kings and State of New York, this fourth day of March, 1907.

WILLIAM N. PARKES.

Witnesses:
J. B. McGirr,
W. W. Ketchum.